United States Patent
Denen et al.

(10) Patent No.: US 6,765,356 B1
(45) Date of Patent: Jul. 20, 2004

(54) CONTROL AND MOTOR ARRANGEMENT FOR USE IN MODEL TRAIN

(75) Inventors: Dennis J. Denen, Westerville, OH (US); Neil P. Young, Redwood City, CA (US); Gary L. Moreau, Rochester, MI (US); Martin Pierson, Howell, MI (US); Robert Grubba, Ormond Beach, FL (US)

(73) Assignee: Lionel L.L.C., Chesterfield, MI (US)

( * ) Notice: Subject to any disclaimer, the term of this patent is extended or adjusted under 35 U.S.C. 154(b) by 0 days.

(21) Appl. No.: 09/702,466

(22) Filed: Oct. 31, 2000

Related U.S. Application Data

(63) Continuation-in-part of application No. 09/185,558, filed on Nov. 4, 1998, now abandoned.

(51) Int. Cl.[7] .............................................. B65H 59/38
(52) U.S. Cl. ..................... 318/6; 318/282; 318/283; 318/16; 446/410; 434/74; 367/127; 104/296
(58) Field of Search ............................. 318/6, 16, 139, 318/245–283; 446/410, 409, 431, 456, 448, 485, 219, 175, 381; 434/74, 62, 71, 29, 69, 365, 63; 367/127; 104/296; 340/825.69, 825.72, 441.692

(56) References Cited

U.S. PATENT DOCUMENTS

| | | | | |
|---|---|---|---|---|
| 3,736,484 A | * | 5/1973 | Reynolds et al. | ............ 318/587 |
| 4,567,757 A | * | 2/1986 | Melocik et al. | ................ 701/70 |
| 4,855,652 A | * | 8/1989 | Yamashita et al. | ........... 318/268 |
| 4,925,424 A | * | 5/1990 | Takahashi | .................... 446/175 |
| 5,174,216 A | * | 12/1992 | Miller et al. | ................. 104/296 |
| 5,195,920 A | * | 3/1993 | Collier | ......................... 446/409 |
| 5,241,517 A | * | 8/1993 | Carolan | ....................... 367/127 |
| 5,317,244 A | * | 5/1994 | Ishikura | ....................... 318/254 |
| 5,394,068 A | * | 2/1995 | Severson et al. | ............ 318/280 |
| 5,448,142 A | | 9/1995 | Severson et al. | |
| 5,456,604 A | * | 10/1995 | Olmsted et al. | ............... 434/62 |
| 5,555,815 A | * | 9/1996 | Young et al. | ................ 104/296 |
| 5,635,903 A | * | 6/1997 | Koike et al. | ................. 340/441 |
| 5,659,217 A | | 8/1997 | Petersen | |
| 5,707,237 A | * | 1/1998 | Takemoto et al. | ............. 434/69 |
| 5,749,547 A | | 5/1998 | Young et al. | |
| 5,773,939 A | * | 6/1998 | Severson et al. | .............. 318/51 |
| 5,848,791 A | * | 12/1998 | Beyer et al. | ................. 273/359 |
| 5,855,004 A | | 12/1998 | Novosel et al. | |
| 5,896,017 A | * | 4/1999 | Severson et al. | ............ 312/280 |
| 5,940,005 A | * | 8/1999 | Severson et al. | ....... 340/825.52 |
| 6,033,285 A | * | 3/2000 | Fine et al. | ................... 446/465 |
| 6,194,856 B1 | * | 2/2001 | Kobayashi et al. | .......... 318/432 |
| 6,220,377 B1 | * | 4/2001 | Lansberry | .................. 180/6.48 |
| 6,220,552 B1 | * | 4/2001 | Ireland | .................... 246/122 R |
| 6,351,096 B1 | * | 2/2002 | Jang | ............................ 318/811 |
| 2001/0005001 A1 | * | 6/2001 | Ireland | .................... 246/122 A |

* cited by examiner

*Primary Examiner*—Rita Leykin
(74) *Attorney, Agent, or Firm*—Dykema Gossett PLLC

(57) ABSTRACT

A control and motor arrangement for use in a model train includes a control arrangement integrally constructed with a motor. The control arrangement receives rotational speed and positional information from the motor and uses this information to determine how much power to supply to the motor, thus controlling the rotational speed of the motor. In this way, the control arrangement maintains a constant motor speed, if desired. In addition, the speed and positional information is optionally provided to a sound control arrangement for use in selecting appropriate sound effects.

14 Claims, 10 Drawing Sheets

US 6,765,356 B1

CONTROL AND MOTOR ARRANGEMENT FOR USE IN MODEL TRAIN

RELATED APPLICATIONS

This application is a continuation-in-part (CIP) of U.S. Ser. No. 09/185,558 filed Nov. 4, 1998, now abandoned.

FIELD OF THE INVENTION

The present invention relates to model railroads. More particularly, the present invention relates to control and motor arrangements for use in model trains.

BACKGROUND

Model train systems have been in existence for many years. In a typical model train system, the model train engine is an electrical engine that receives power from a voltage that is applied to the tracks and picked up by the train motor. A transformer is used to apply the power to the tracks. The transformer controls both the amplitude and polarity of the voltage, thereby controlling the speed and direction of the train. In HO systems, the voltage is a DC voltage. In Lionel® systems, the voltage is an AC voltage transformed from the 60 Hz line voltage provided by a standard wall socket.

Some conventional types of model train systems are susceptible to performance degradation related to track irregularities. For example, uneven portions of the track can cause the model train to intermittently lose contact with the track, causing power to be inadvertently removed from the train. Unwanted stopping can result. In addition, upward and downward grades in the track can cause the model train to travel slower or faster than desired due to the effects of gravity. Moreover, certain model train systems fail to adequately simulate the effects of inertia. For example, in some systems, when power is removed from the train, the train stops moving immediately. By contrast, real world trains do not stop immediately when brakes are applied. Accordingly, in some model train systems, play-realism is reduced by these sudden stops.

SUMMARY OF THE INVENTION

According to one embodiment, the present invention is directed to a control and motor arrangement for use in a model train. The control and motor arrangement includes a motor, configured and arranged to generate a locomotive force for propelling the model train. A control arrangement is coupled to receive speed information from the motor and is configured and arranged to provide a control signal to the motor for controlling the speed of the motor.

Another embodiment of the present invention is directed to a control and motor arrangement for use in a model train. The control and motor arrangement includes a motor, configured and arranged to generate a locomotive force for propelling the model train. A control arrangement is configured and arranged to provide a speed control signal to the motor generated as a function of speed information received from the motor. The control arrangement is further configured and arranged to provide the information received from the motor to a sound control arrangement.

Still another embodiment of the present invention is directed to a control and motor arrangement for use in a model train. A motor is configured and arranged to generate a locomotive force for propelling the model train. A power arrangement coupled to a model railroad track used by the model train is configured and arranged to supply power to the control and motor arrangement. A command control interface, which is a radio control interface in the preferred embodiment, receives commands from a command control unit, which is a radio control unit in the preferred embodiment. A process control arrangement, responsive to the command control interface, is configured and arranged to control a rotational speed of the motor in response to rotational speed information received from the motor. A motor control arrangement is responsive to the process control arrangement and is coupled to receive power from the power arrangement. The motor control arrangement generates a magnetic field for driving the motor. A sound information arrangement receives rotational speed and positional information from the motor and provides the rotational speed and positional information to a sound control arrangement for simulating railroad sounds.

The above summary of the present invention is not intended to describe each illustrated embodiment or every implementation of the present invention. The figures and the detailed description that follow more particularly exemplify these embodiments.

BRIEF DESCRIPTION OF THE DRAWINGS

These and other aspects and advantages of the present invention will become apparent upon reading the following detailed description and upon reference to the drawings, in which.

Figure 1:
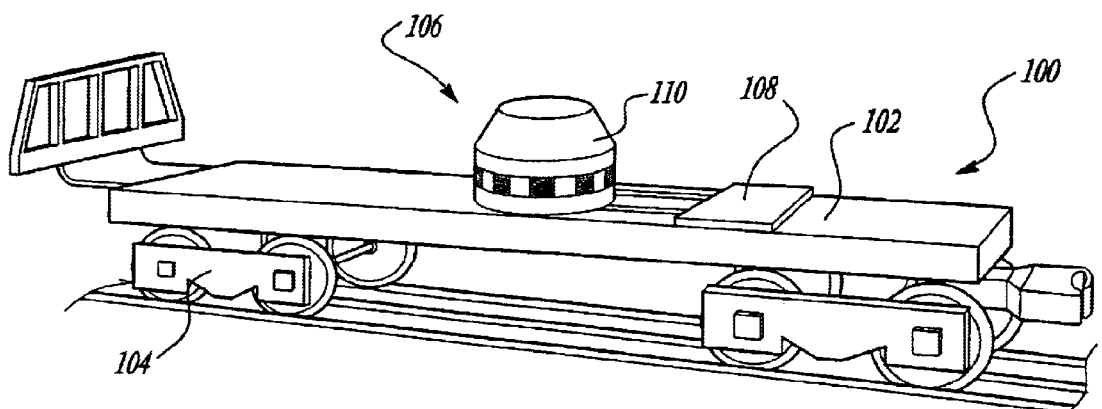
FIG. 1 illustrates an example control and motor arrangement installed in a model train, according to an embodiment of the present invention.

The invention is amenable to various modifications and alternative forms.

Specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of model railroad systems. The invention has been found to be particularly advantageous in environments in which it is desirable to operate a model train under a variety of rail conditions. An appreciation of various aspects of the invention can be gained through a discussion of various application examples operating in such environments.

According to one embodiment of the present invention, a control arrangement receives information from a model train motor regarding the current speed and position of the motor. This information is used to maintain a constant operating speed of the motor over a variety of rail conditions, including, for example, changes in grade. The motor realizes higher torque and efficiency. In addition, jerking and other adverse effects commonly associated with low speed operation of the motor are reduced. Furthermore, an inertial effect can be simulated by continuing to operate the motor for a duration after a main power source is disconnected from the motor. In another particular embodiment of the present invention, two or more motors are disposed on opposite surfaces of a control arrangement. Using multiple motors increases the locomotive power available to the model train.

In still another particular embodiment of the present invention, the motor speed and position information, as well as information relating to power consumption by the motor, is provided to a sound control system. The sound control system uses this information in selecting sounds to generate, enhancing the realism of the model railroad system and, for many hobbyists, the level of enjoyment.

Referring now to the drawings, FIG. 1 depicts a control and motor arrangement installed in a model train 100. The model train 100 includes a platform 102, under which a wheeled carriage 104 is mounted to support the model train 100 on a track (not shown). A control and motor arrangement 106 is mounted on a top surface of the platform 102. The control and motor arrangement 106 includes a control arrangement 108, which is coupled to control the amount of power supplied to a motor 110. This motor 110 can be implemented using any of a variety of motor types, including, for example, a DC can-type, ODYSSEY™-type, or PULLMOR™ type motor, commercially available from Lionel LLC of Chesterfield, Michigan. Those skilled in the art will recognize that other motor types can be used in the alternative, and that the preceding examples are provided by way of illustration and not limitation. The control arrangement receives from the motor 110 speed information relating to the current rotational speed of the motor 110 and uses this information to adjust the amount of power applied to the motor 110 using a closed feedback loop.

In addition, the control arrangement 108 optionally further receives from the motor 110 information relating to, for example, the position within the rotational cycle of the motor 110 and/or the amount of power consumed by the motor 110. This information is used in deciding how much power to apply to the motor 110. For example, slow rotation of the motor 110 can indicate that the model train 100 is traveling along an upward slope. To compensate for this slope, the control arrangement 108 supplies additional power to the motor 110. By compensating for variations along the model railroad track, the control arrangement 108 maintains the motor 110 at a constant rotational speed, if the user so desires.

The control arrangement 108 can also be used to produce other effects that enhance the sense of realism a user enjoys when operating the model train 100. For example, a real train is significantly affected by inertia. This effect can be observed both when the train starts and stops moving. When a real train starts moving, it does not accelerate to full speed immediately. On the contrary, the train accelerates slowly due to inertia. This effect can be simulated in the model train 100 by applying power to the motor 110 gradually, even when the user commands the model train 100 to assume full speed immediately. Just as a real train typically does not accelerate to full speed instantaneously, it does not, under normal operating conditions, immediately halt when power is removed. Rather, inertia causes the train to continue to move for some time before coming to a halt. This gradual stopping can be simulated in the model train 100 by supplying power to the motor 110 from an alternate power source, such as a battery (not shown), for a time after the primary power source is disconnected from the motor 110.

The information provided by the motor 110 to the control arrangement 108 is optionally also provided to other systems in the model train 100, such as a sound control system. The sound control system can use this information in generating realistic sound effects. For example, if the sound control system receives an indication that the motor 110 is drawing a relatively large amount of power without a correspondingly large increase in speed, the sound control system can fairly conclude that the motor 110 has to work harder to maintain the model train 100 at a constant speed. The sound control system can then select or generate a sound effect that simulates the sound of a train engine straining to drive a train up a hill.

Figure 2:
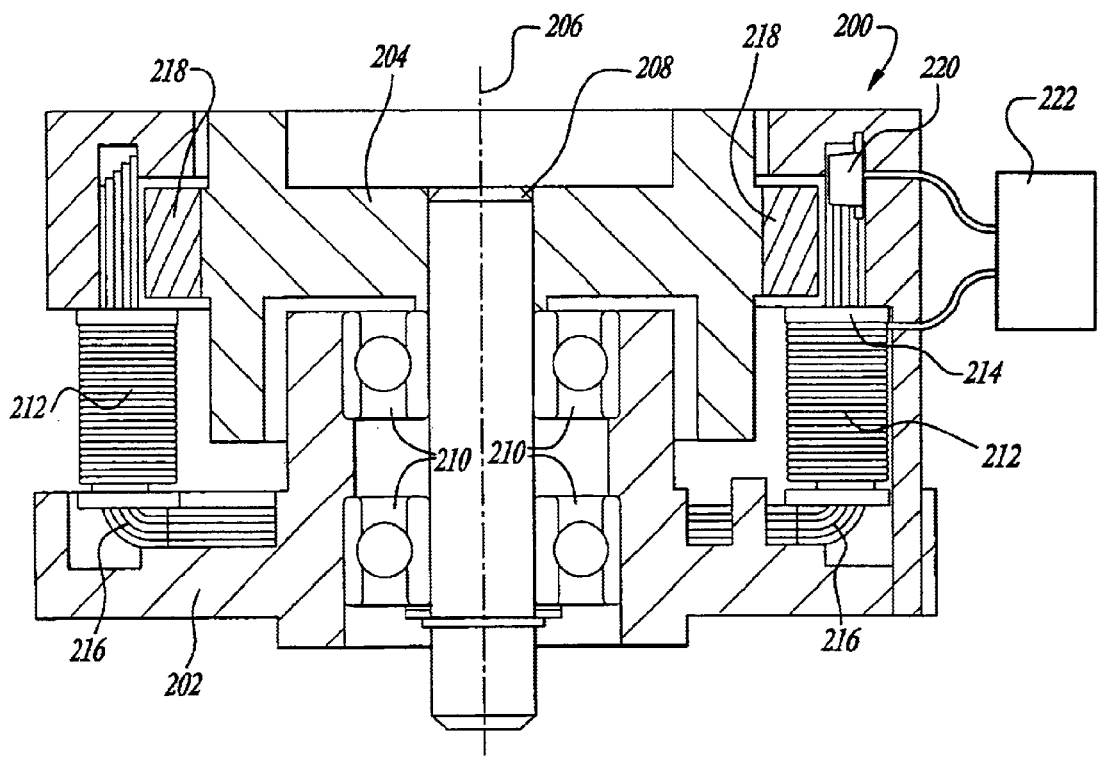
FIG. 2 is a profile view, in section, of an example control and motor arrangement for use in a model train, according to another embodiment of the present invention.

FIG. 2 illustrates an example control and motor arrangement 200 for use in a model train. A circular base 202 forms a support structure, upon which a rotor 204 is mounted. The rotor 204 rotates about an axis 206 when the control and motor arrangement 200 is energized, driving a motor shaft 208 into rotation about the axis 206. The motor shaft 208 is supported by a bearing structure comprising spaced apart bearings 210.

Figure 3:
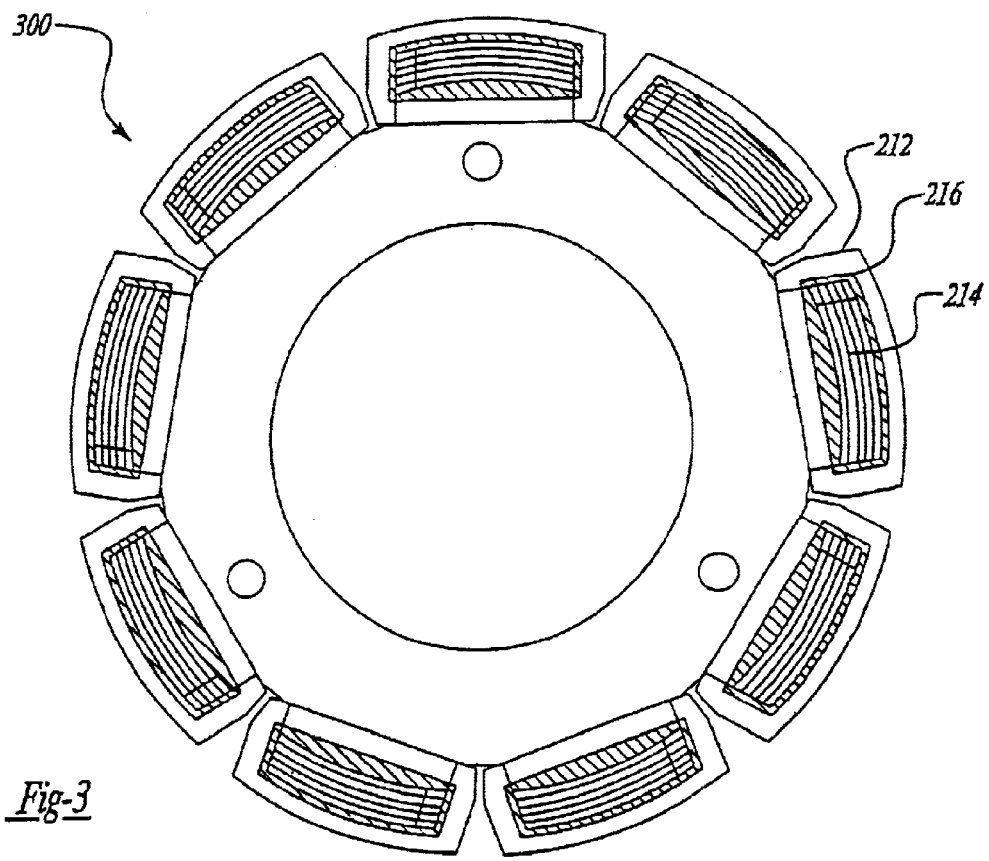
FIG. 3 is a plan view of an example control and motor arrangement for use in a model train, according to another embodiment of the present invention.

When the motor is energized, a plurality of windings 212 wound around respective bobbins 214 interact to generate an electromagnetic field within laminar core components 216 and the base 202. This field interacts with magnets 218 mounted on the rotor 204, causing the rotor 204 to rotate about the axis 206. The motor shaft 208 is thus driven into rotation. FIG. 3 illustrates in plan view one example of a configuration of windings 212 and core components 216. In the particular example illustrated in FIG. 3, a stator winding assembly 300 consists of nine core components 216 and associated bobbins 214 and windings 212. As the motor shaft 208 rotates, a plurality of rotation sensors, one of which is depicted at reference numeral 220, detect the change in position of the rotor 204. These rotation sensors 220 can be implemented, for example, using conventional Hall effect detectors. The Hall effect detectors sense voltages produced by changes in the electromagnetic field set up by the windings 212. In a particular embodiment of the present invention, a plurality of Hall effect detectors, e.g., three, are evenly disposed around the circumference of the control and motor arrangement 200. With this configuration of rotation sensors 220, the voltage produced in each rotation sensor 220 varies as a function of the position of the rotor 204 with respect to the base 202. A control circuit arrangement 222 is connected to the motor. The control circuit arrangement 222 receives input from the Hall effect detectors and determines, from the voltages produced in each detector, the position of the rotor 204 in the rotation cycle. In addition, the control circuit arrangement 222 monitors changes in the voltages produced in the detector to infer how quickly the rotor position changes, i.e., the rotational speed of the rotor 204.

The control circuit arrangement 222 uses this speed and positional information to determine whether, and to what extent, to alter the amount of power supplied to the motor. For example, if the control circuit arrangement 222 determines that the rotor 204 is rotating slowly for the amount of power supplied to it, the control circuit arrangement 222 can command that more power be supplied to the motor. According to a particular embodiment of the present invention, the speed and positional information is also provided to a sound control arrangement (not shown) to facilitate the generation of sound effects with enhanced realism.

Figure 4:
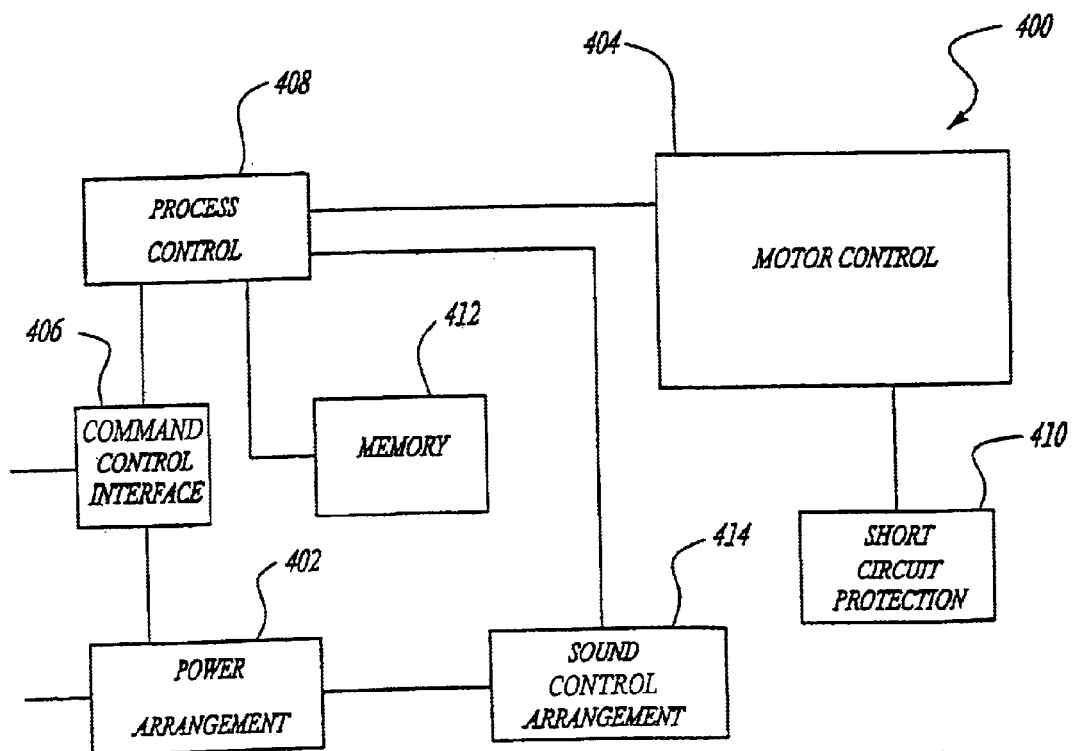
FIG. 4 is a block diagram illustrating an example control arrangement forming part of a control and motor arrangement for use in a model train, according to yet another embodiment of the present invention.

FIG. 4 illustrates in block diagram form an example control circuit arrangement 400 forming part of a control and motor arrangement, according to another embodiment of the present invention. A power arrangement 402 supplies power to the system. The power arrangement 402 receives power from the model railroad track and also includes a battery circuit to supply power in certain situations, such as when the model train travels over an uneven portion of the track and makes only intermittent contact with the track. Power is supplied to a motor control arrangement 404, which creates the rotating magnetic field that drives the motor. The power arrangement 402 also provides power to other components of the system, such as a sound control arrangement 414.

It is understood that the present invention may be used with model toy trains which operate with either command control interfaces, or trains which are conventionally controlled through variations in the track voltage (e.g. use of a D.C. offset to sound a model toy train horn) to control the train. The conventional train would require modification to include speed control arrangement 222 including sensors 220 connected thereto as shown in FIG. 7.

A command control interface 406 provides an interface between the control arrangement 400 and a command control unit operated by the user. The radio controller unit is used to access various functions, such as speed control, sound effects, and the like. A process control arrangement 408 receives commands from the command control interface 406 and maintains the speed of the motor at the desired level. For example, if the user commands the model train to run at 40 mph, the process control arrangement 408 maintains the speed at 40 mph, compensating for such factors as upward or downward grades or curves in the track. The process control arrangement 408 also detects faults in the system, such as short circuits. In the event of a short circuit, a short circuit protection arrangement 410 disengages power from the motor when the current flow exceeds a predefined threshold.

The process control arrangement 408 accesses a memory 412, which stores certain user-defined information. For example, the user can define a relationship between the rotational speed of the motor and a corresponding speed of the model train. In a particular embodiment of the present invention, the memory 412 is implemented using a nonvolatile memory to facilitate storage of the user-defined information after power is removed from the system.

Figure 7A:
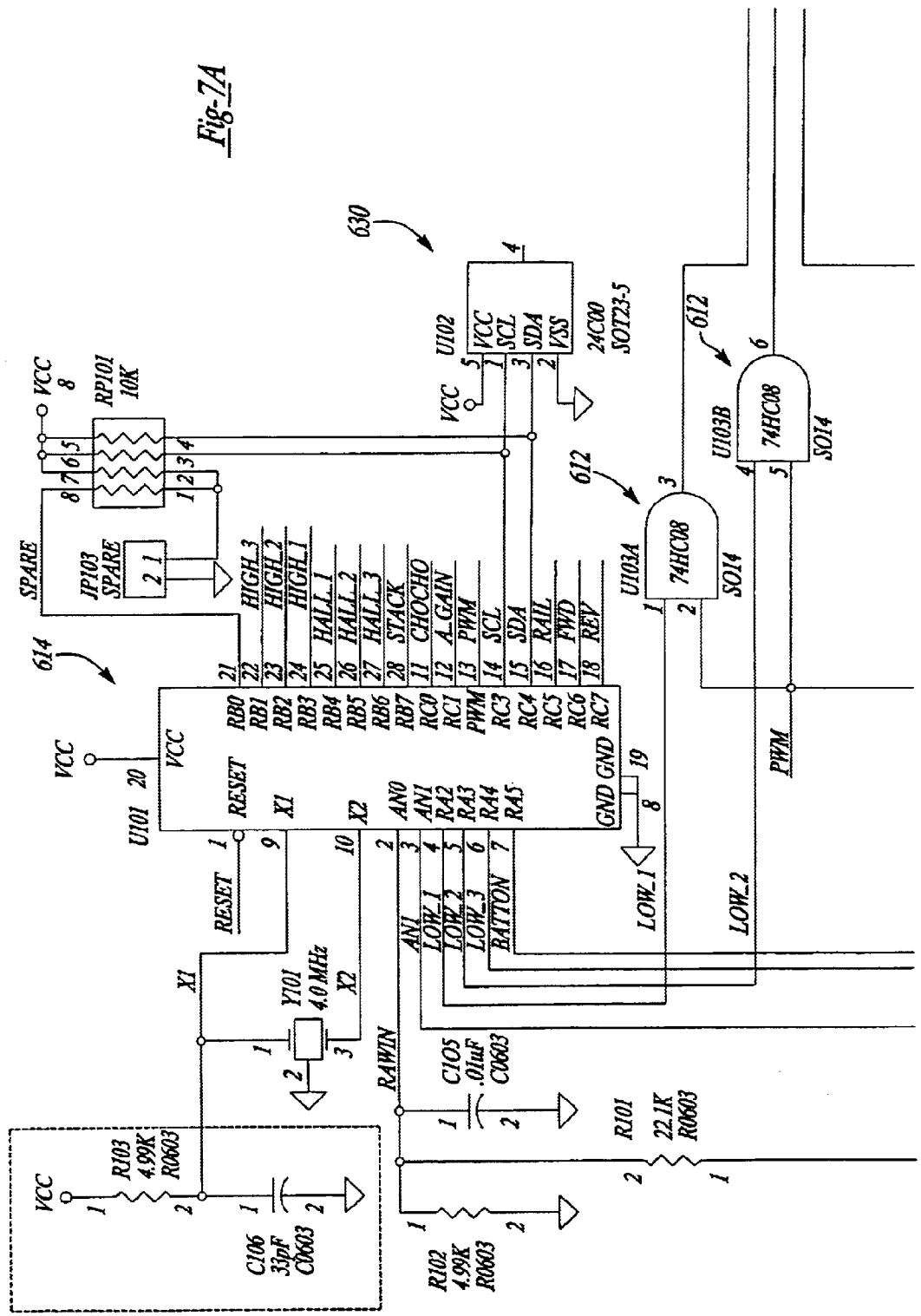
Figure 7B:
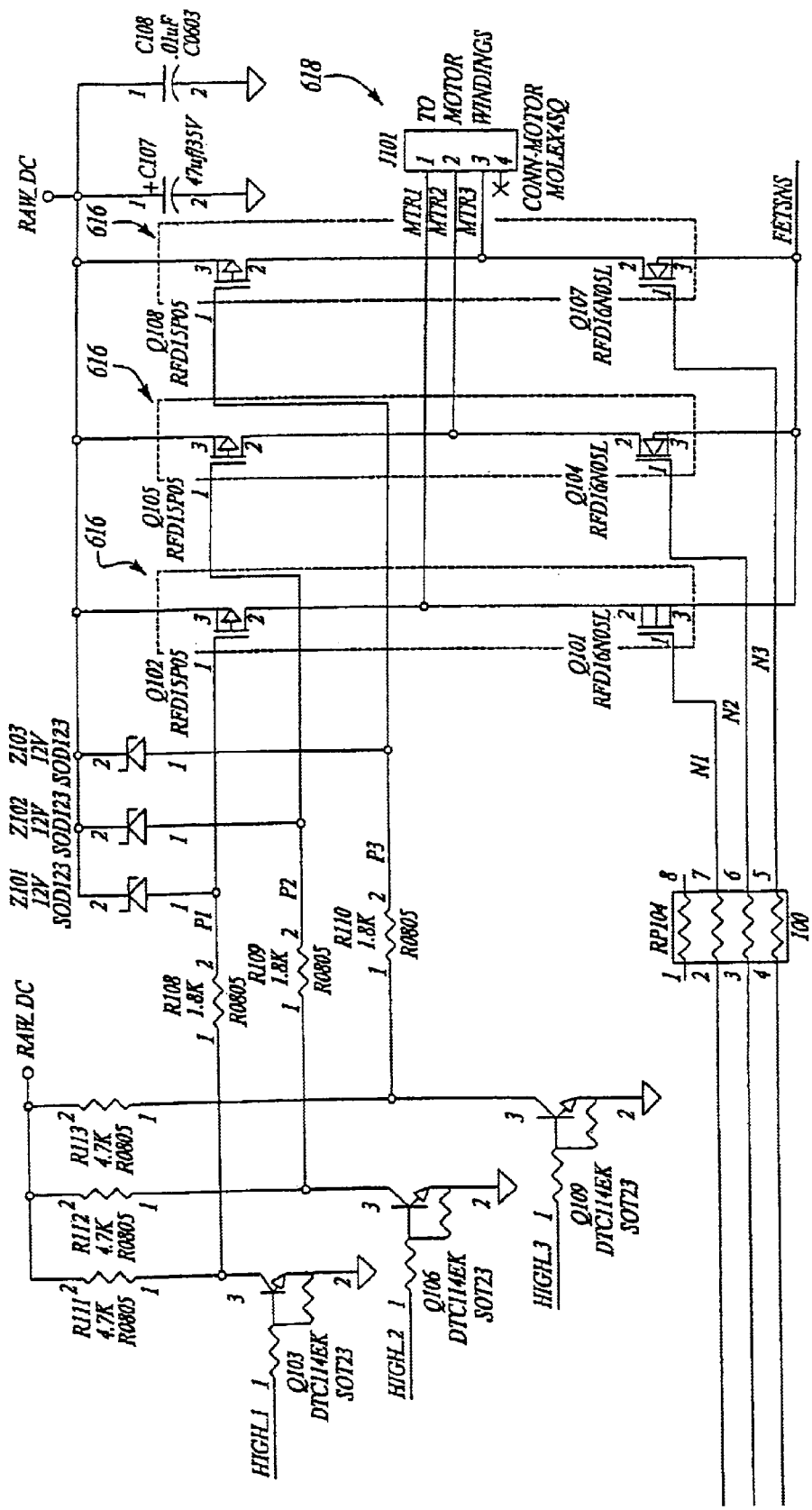
Figure 7C:
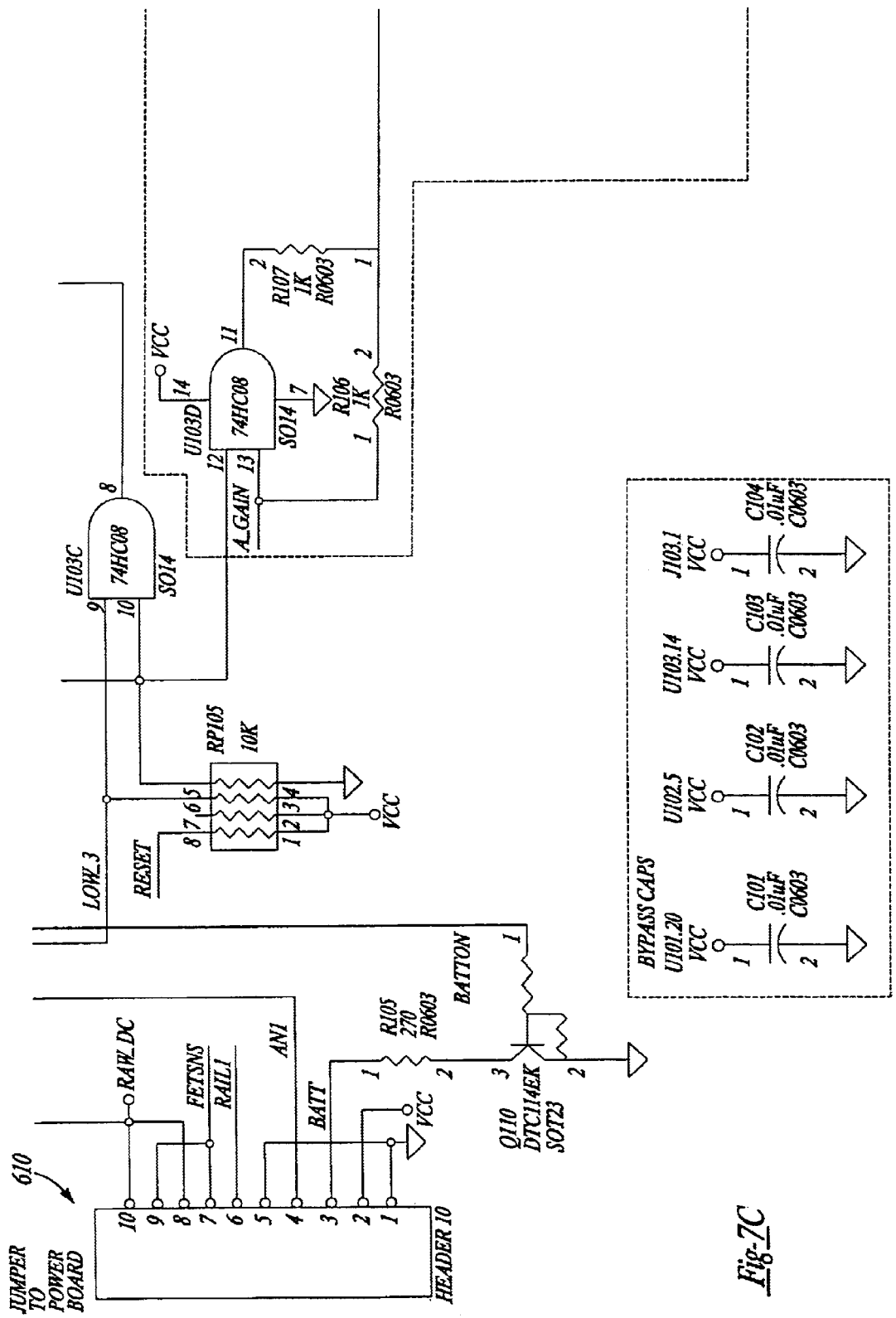
Figure 7D:
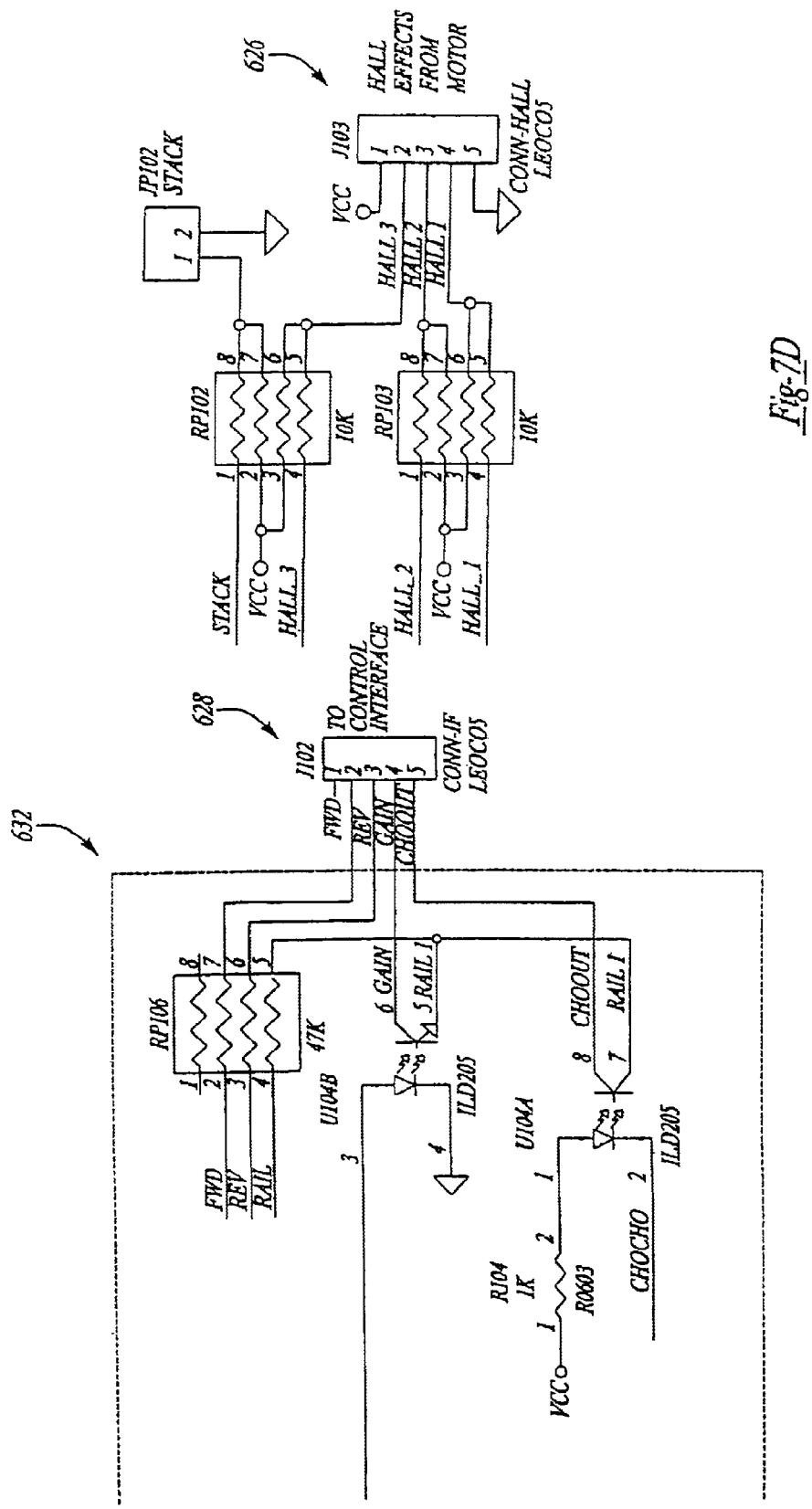
Figure 8:
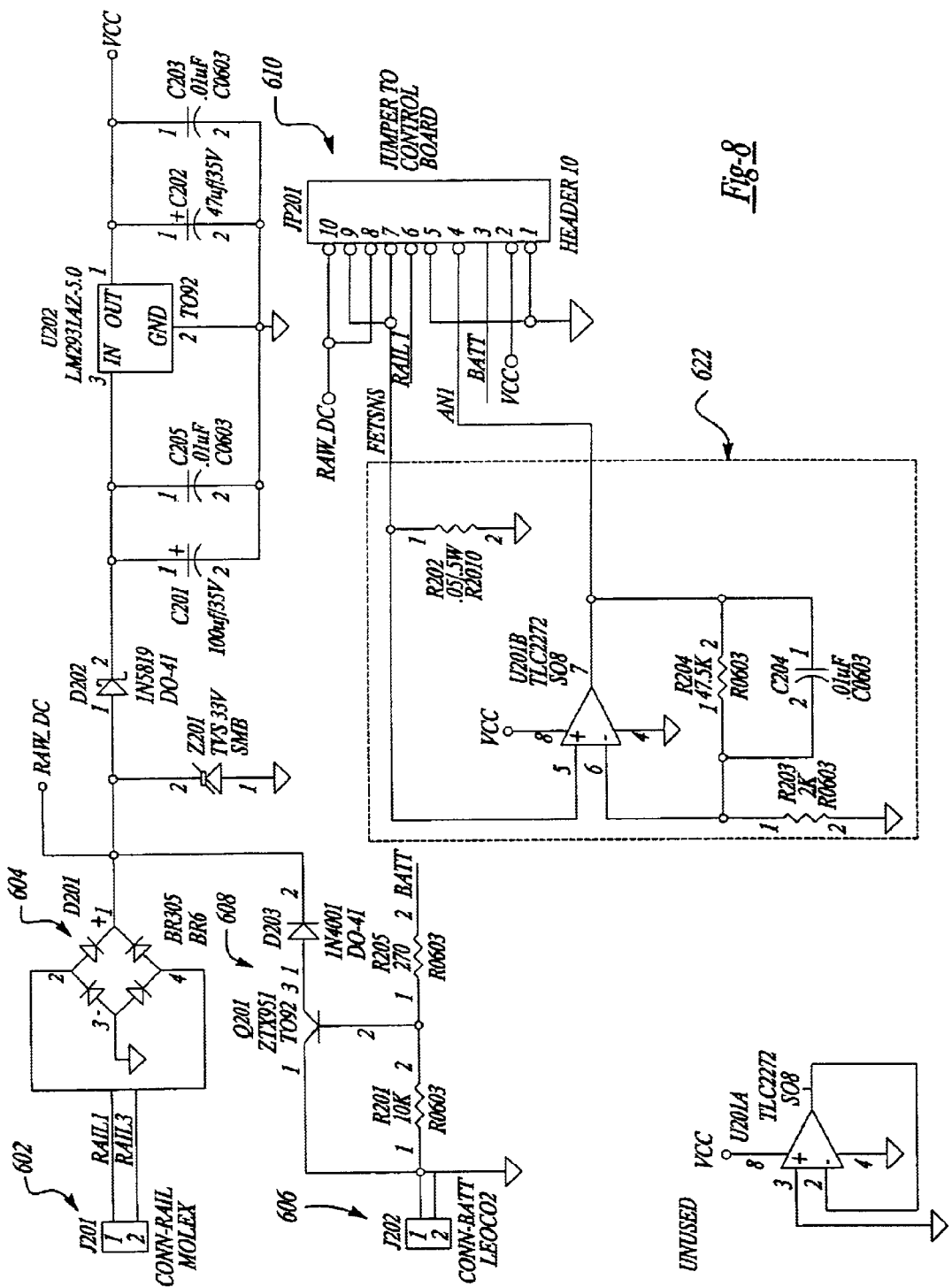

The present invention may use a detected track voltage in implementing a speed control arrangement for conventionally controlled model trains. Track voltage is detected between rail 1 and rail 3 as shown in FIG. 7 and 8. Referring first to FIG. 8, full-wave rectifier bridge 604 provides a DC voltage (RAW DC) which is proportional to the AC track voltage present on rail 1 and rail 3. RAW DC is supplied to software programmed microcontroller U101 (FIG. 7A) via jumper JP201 (FIG. 8), header 610 (FIG. 7C), resistors R101, R102 (FIG. 7A), and capacitor C105 (FIG. 7A). In this way microcontroller U101 can determine the level fo AC track voltage present on rail 1 and rail 3. Those of ordinary skill in the art will recognize that many circuit variation are possible for determining the level of AC track voltage.

Control arrangement 408 may apply a defined percentage of the track voltage to motor 110. The difference between the track voltage and the voltage applied to motor 110 is not used and is effectively kept in reserve. When the speed of motor 110 decreases, such as when the model toy train encounters increased loading, control circuit arrangement 222 detects a reduction in speed and increases the amount of track voltage sent to motor 110. For example, at a comparatively low speed, roughly 60% of the available track voltage may be applied to motor 110, with 40% of available track voltage being kept in reserve. At increased loading of motor 110, its rotational speed will decrease. The decrease in speed will be sensed by sensors 220 and process control arrangement 222 will operate to apply an increased voltage to motor 110 thereby reducing the amount kept in reserve and keeping motor 110 at its selected speed.

For conventional model toy trains outfitted with arrangement 222 and sensors 220, speed may additionally be set as follows. A user may adjust the track voltage to a desired speed and once at that point simultaneously press the horn and raise the track voltage thereby establishing the fixed speed for the speed control. It is understood that other combinations of signals may also be programmed to set speed. The user may then increase the track voltage to establish a reserve to be used to maintain the speed of motor 110 during increased loading as above described.

A sound information arrangement 414 detects certain operating conditions of the model train and transmits information relating to these conditions to a sound control arrangement (not shown). For example, the sound information arrangement 414 is configured to detect whether the train is traversing a grade and, if so, whether the grade is upward or downward. The sound control arrangement processes this information and selects appropriate sound effects to enhance the sense of realism. For example, if the model train is moving uphill, the process control arrangement 408 senses that more power is required to maintain a constant speed. The process control arrangement 408 thus increases the power supply to the motor. In addition, the sound information arrangement 414 informs the sound control arrangement that more power has been supplied to the motor. The sound control arrangement then selects a sound effect consistent with additional power, such as increased simulated diesel engine noise.

Figure 5A:
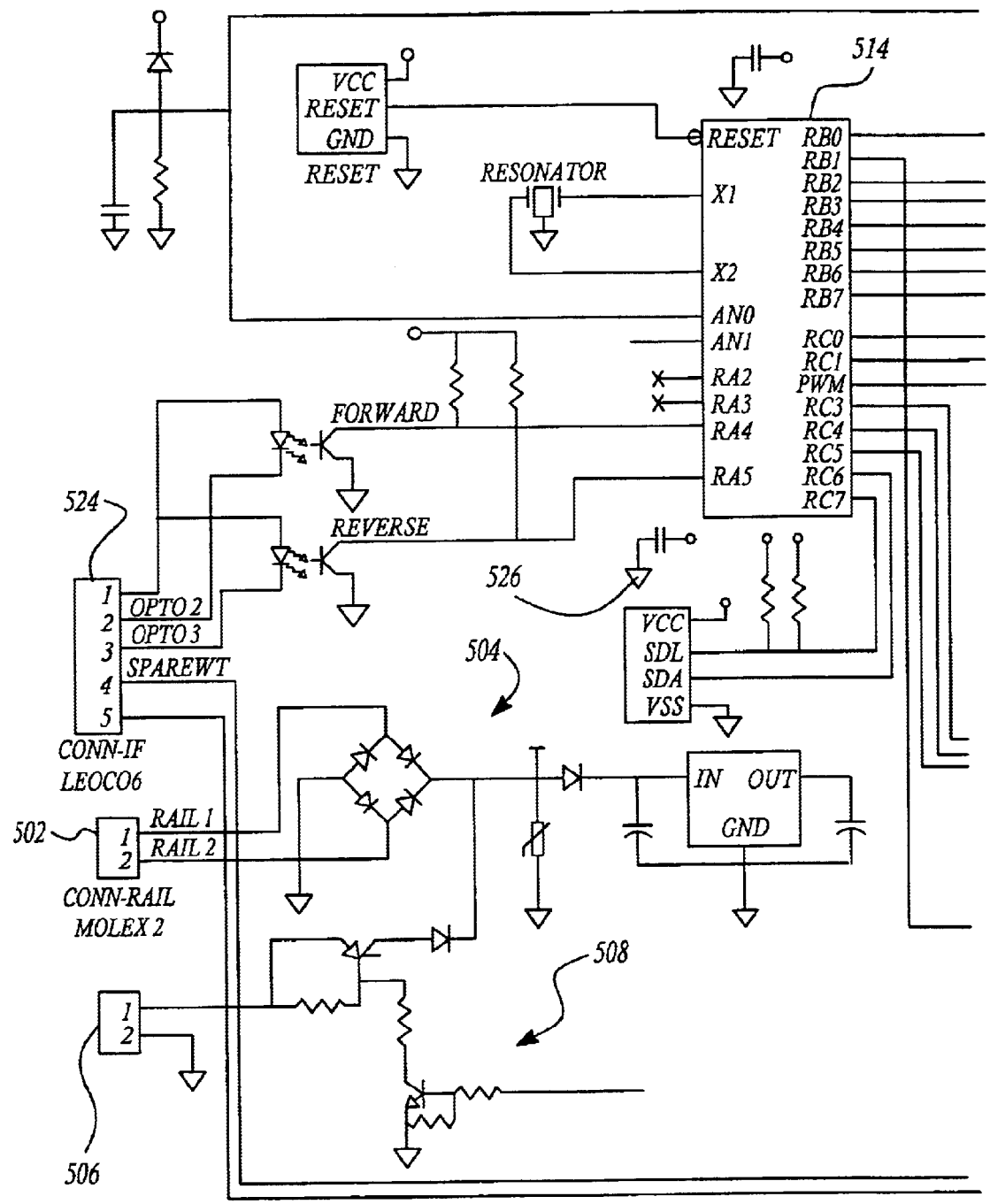
FIGS. 5A and 5B are portions of a schematic diagram depicting an example circuit arrangement for implementing the control arrangement illustrated in FIG. 4.
Figure 5B:
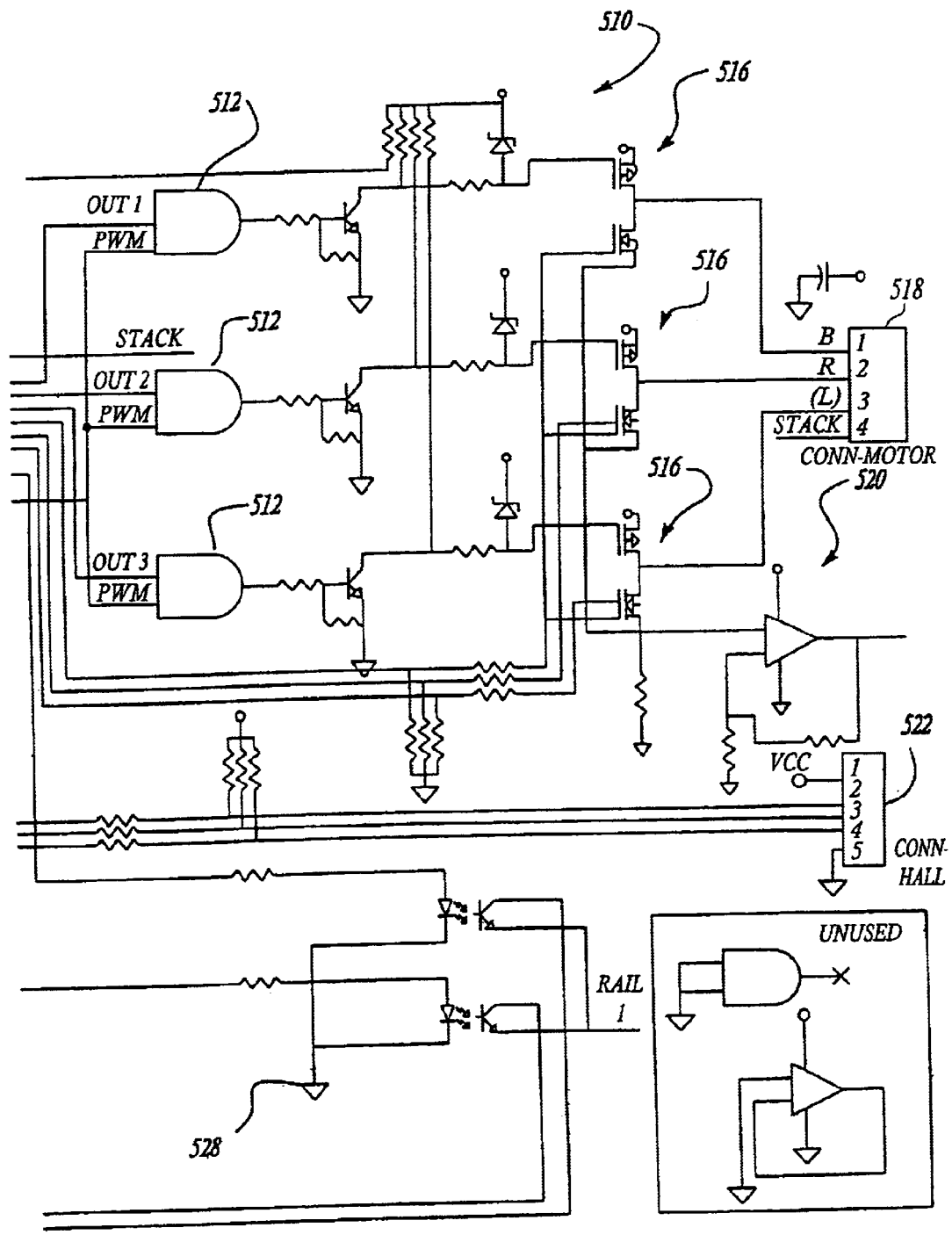

FIGS. 5A and 5B illustrate an example circuit arrangement implementing the control arrangement 400 of FIG. 4, according to a particular embodiment of the present invention. Primary power is supplied to the circuit from a connection 502 to a rail power supply. A rectifier arrangement 504 converts the AC voltage between the rails to a DC voltage for use by the train. In addition, a connection 506 to a battery serves as an alternate power source when, for example, contact with the rails is interrupted. With the battery serving as a secondary power source, the train maintains operation in the event of such interruptions. A battery circuit 508 conveys power from the battery to the control arrangement 400. A motor controller 510 is responsible for generating the rotating magnetic field that drives the train motor. In the specific embodiment illustrated in FIGS. 5A and 5B, this magnetic field is generated in three alternating zones. These three zones correspond to three AND gates 512, each of which receives as input a pulse width modulation signal PWM and a control signal OUTi. The control signals OUT are provided by a process controller 514, the operation of which is discussed in detail below. When the control signal OUT and the pulse width modulation signal PWM are both active for a particular AND gate 512, power is supplied to a corresponding portion of the motor through a CMOS arrangement 516 and a motor connection 518. As each portion of the motor receives power in turn, a magnetic field is generated in that portion of the motor. A short circuit protection circuit 520 provides a path to ground in the event of a short circuit. The control signals OUT are generated by the process controller 514 so as to cause the field to rotate around the motor.

To generate the control signals OUT, the process controller 514 monitors the rotational speed of the motor using an input 522 coupled to, for example, a Hall effect sensor. Monitoring the speed of the motor enables the process controller 514 to is maintain a constant speed, if desired, over a variety of track conditions. For example, if the process controller 514 senses that the motor is rotating slowly relative to the amount of power supplied to it, it can infer that the train is traveling uphill or over otherwise challenging terrain and apply more power to the motor. Similarly, if the process controller 514 detects that the motor is rotating quickly relative to the amount of power supplied to it, the process controller 514 can decrease the amount of power supplied to the motor to maintain a constant speed. In this manner, the process controller 514 uses speed control closed loop feedback to maintain the motor at a constant operating speed, regardless of track conditions, when desired.

In addition to the speed of the motor, the process controller 514 optionally receives other inputs that determine the proper amount of power to supply to the motor. For instance, as illustrated in FIGS. 5A and 5B, the process controller 514 receives information from a user-operated remote control through a radio control interface 524. This information includes, for example, the desired simulated speed of the train, directional control information, and commands to effect simulation of various sound effects.

The determination of how much power to supply to the motor depends not only on the input from the remote control and the current speed of the motor, but also on certain user-defined information, such as a mapping between a real-world train speed to be simulated and an actual speed of the model train. In the embodiment illustrated in FIGS. 5A and 5B, this user-defined information is stored in a non-volatile memory 526, such as a ROM or an EPROM.

According to a particular embodiment of the present invention, the process controller 514 outputs speed information to a sound control circuit (not shown) using an output interface 528. The sound control circuit uses the speed information to determine how to generate or select an appropriate, realistic sound effect. For example, a horn can be programmed to sound relatively quietly when the train is running slowly, but forcefully as the train picks up speed.

Figure 6:
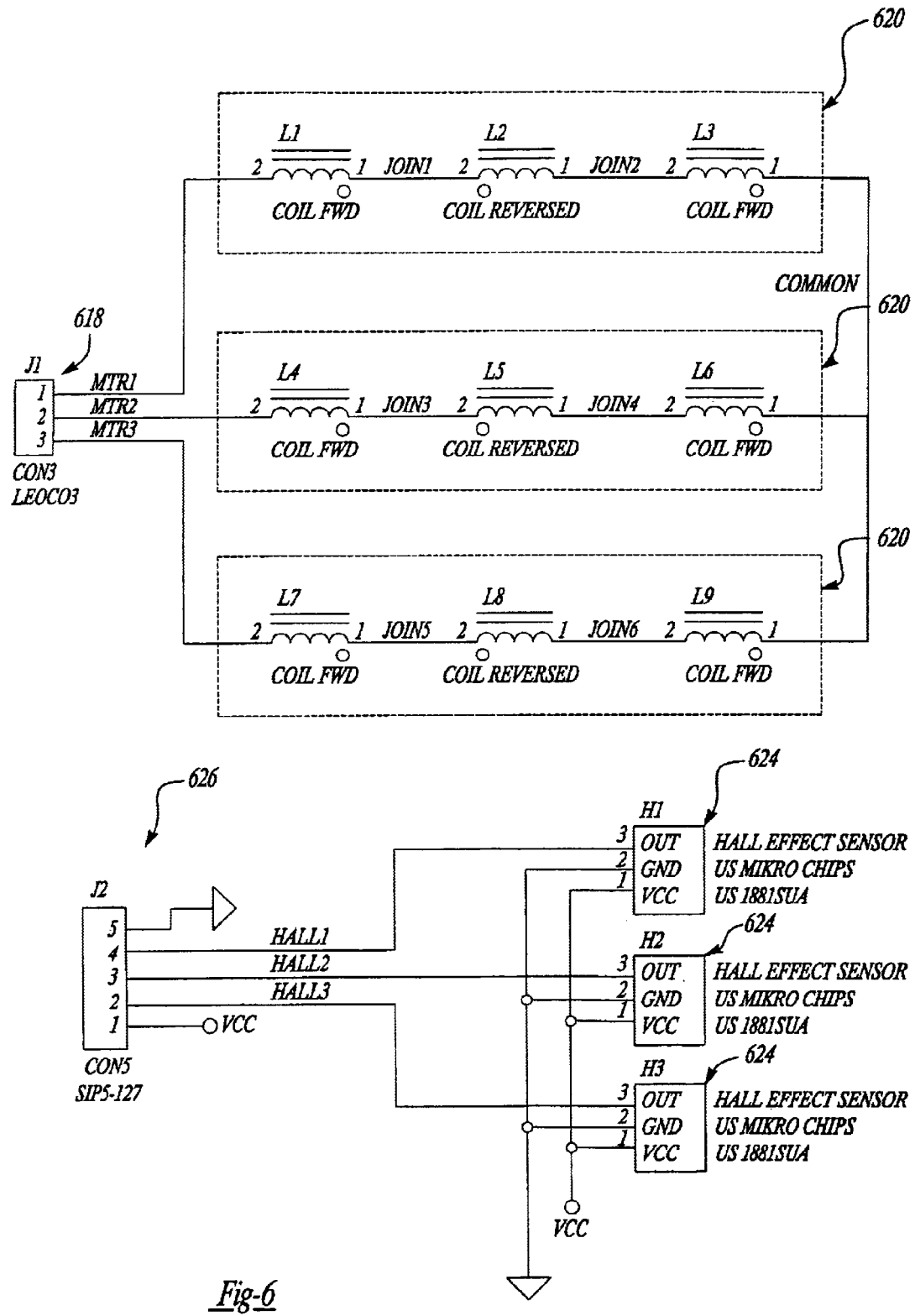
FIGS. 6, 7A–7D, and 8 are portions of a schematic diagram depicting another example circuit arrangement for implementing the control arrangement illustrated in FIG. 4.

FIGS. 6–8 depict another example circuit arrangement implementing the control arrangement 400 of FIG. 4, according to still another embodiment of the present invention. In the circuit arrangement illustrated in FIGS. 6–8, primary power is supplied to the circuit from a connection 602, illustrated on FIG. 8, to a rail power supply. A full-wave rectifier bridge 604 converts the AC voltage between the rails to a DC voltage for use by the train. In addition, a connection 606 to a battery serves as an alternate power source when contact with the rails is interrupted. The train can thus maintain operation even when such interruptions occur. A battery circuit 608 conveys power from the battery to the control arrangement 400 through a connection 610. To drive the train motor, the control arrangement generates a rotating field. In the specific embodiment illustrated in FIGS. 6–8, the magnetic field is generated in three alternating zones, each corresponding to an AND gate 612. Each AND gate 612 receives as input a pulse width modulation signal PWM and a control signal LOW 1, LOW 2, or LOW 3. These signals are generated by a microprocessor 614, the operation of which is discussed in further detail below. When the control signal LOW n (where n is 1, 2, or 3) and the pulse width modulation signal PWM are both active for a particular AND gate 612, power is supplied to a corresponding portion of the motor using a respective CMOS arrangement 616. A motor connector 618 provides power to a respective zone of the motor. On FIG. 6, the zones are depicted at reference numerals 620. As each zone of the motor receives power in turn, a magnetic field is generated in that zone. A short circuit protection circuit, depicted at reference numeral 622 on FIG. 8, provides a path to ground in the event of a short circuit. The microprocessor 614 generates the control signals LOW n so as to cause the field to rotate around the motor.

To generate the control signals LOW n, the microprocessor 614 monitors the rotational speed of the motor using interfaces (624 of FIG. 6) to Hall effect sensors (not shown). A connector 626 connects the interfaces 624 to the microprocessor 614. By monitoring the motor speed, the microprocessor 614 can use closed loop feedback to adjust the amount of power supplied to the motor in response to changes in motor speed. Thus, the microprocessor 614 can maintain a constant speed over a variety of track conditions, such as changes in grade.

The microprocessor 614 can also receive other inputs to influence the amount of power to be supplied to the motor. For example, a connection 628 to a control interface enables the hobbyist to provide additional information to the microprocessor 614 using a user-operated radio controller. This information includes, for example, the desired simulated speed of the train, directional control information, and commands to effect simulation of various sound effects. User-defined information, such as a mapping between a real-world train speed to be simulated and an actual speed of the model train, also affects the determination of the amount of power to supply to the motor. In the embodiment illustrated in FIGS. 6–8, this user-defined information is stored in a non-volatile memory 630.

According to a particular embodiment of the present invention, the microprocessor 614 outputs speed information to a sound control circuit (not shown) using an output interface 632. The sound control circuit uses the speed information to determine how to generate or select an appropriate, realistic sound effect. For example, a horn can be programmed to sound relatively quietly when the train is moving slowly, but forcefully as the train speed increases. It should be noted that, in the embodiment depicted in FIG. 6–8, either resistor 8106 or resistor 8107 of the output interface 632 is installed. In one embodiment, resistor 8106 is installed to allow direct pin control of audio gain control. As an alternative, resistor 8107 can be installed instead, allowing gating of the PWM signal.

The various embodiments described above are provided by way of illustration only and should not be construed to limit the invention. Those skilled in the art will readily recognize various modifications and changes that can be made to these embodiments without strictly following the example embodiments and applications illustrated and described herein, and without departing from the true spirit and scope of the present invention, which is set forth in the following claims.

What is claimed is:

1. A control and motor arrangement for a model toy train comprising:

a motor, configured and arranged to generate a locomotive force for propelling a model train;

a transducer operative in providing rotational position information from the motor, the rotational position information being characteristic of rotational position of the train wheels at which the motor is operating;

a control arrangement, coupled to the transducer to receive rotational information and configured and arranged to cause power to be applied to the motor at different times based on at least the rotational information provided by the transducer, wherein the control arrangement is configured and arranged to simulate effects relative to inertia.

2. A control and motor arrangement, according to claim 1, wherein the control arrangements configured and arranged to, in response to power, being removed from the model train, supply power to the motor from an alternate power source.

3. A control and motor arrangement, according to claim 2, wherein the alternate power source comprises a battery arrangement.

4. A control and motor arrangement, according to claim 1, wherein the control arrangement is configured and arranged to, in response to a train start command, gradually supply power to the motor.

5. A control and motor arrangement for use in a model toy train comprising:

a motor, configured and arranged to generate a locomotive force for propelling the model train;

a transducer coupled to the motor and operative in producing a signal characteristic of rotational speed of the motor;

a control arrangement operative to detect an available track voltage and coupled to receive the rotational speed information from the transducer, the controller being configured and arranged to apply a percentage of the available track voltage to the motor and apply a greater percentage of available track voltage to the motor in response to a signal from the transducer characteristic of a decrease in the rotational speed of the motor.

6. A control and motor arrangement as in claim 5 wherein the controller is configured to set a desired speed in response to a horn signal made simultaneously with an increase in track voltage.

7. A control and motor arrangement for a model toy train comprising:

a motor, configured and arranged to generate a locomotive force for propelling the model train;

a power arrangement, coupled to a model railroad track used by the model train and configured and arranged to supply power to the control and motor arrangement;

a radio control interface, configured to receive commands from a radio controller unit;

a process control arrangement, coupled to receive speed information regarding the rotational velocity of the motor and configured and arranged to generate a plurality of motor control signals based upon a combination of a plurality of speed feedback control signals and pulse width modulation signal;

a motor control arrangement, responsive to the motor control signals and coupled to receive power from the power arrangement and configured and arranged to supply power to the motor at different times based on the motor control signals; and a sound information arrangement, operatively coupled to receive rotational speed and positional information from the motor and to provide the rotational speed and positional information to a sound control arrangement for simulating railroad sounds.

8. A control and motor arrangement, according to claim 7, further comprising:

a short circuit protection arrangement, operatively coupled to the motor and configured and arranged to remove power from the motor in response to a current flow exceeding and defined threshold.

9. A control and motor arrangement according to claim 7 further comprising a memory, responsive to the process control arrangement and configured and arranged so user defined information and to provide the user defined information to the process control arrangement.

10. A control and motor arrangement according to claim 9 wherein the memory comprises a non-volatile memory.

11. A control and motor arrangement according to claim 9 wherein the user defined information includes a mapping of a motor rotational speed to a land speed on the train.

12. A control and motor arrangement for a model toy train comprising:

a motor, configured and arranged to generate a locomotive force for propelling a model train;

a transducer operative in providing rotational position information from the motor, the rotational position information being characteristic of rotational position of the train wheels at which the motor is operating;

a control arrangement, coupled to the transducer to receive rotational information and configured and arranged to cause power to be applied to the motor at different times based on at least the rotational information provided by the transducer;

the control arrangement being configured and arranged to simulate effects relative to inertia and the control arrangement is configured and arranged to, in response to a train start command, gradually supply power to the motor.

13. A control and motor arrangement for a model toy train comprising:

a motor, configured and arranged to generate a locomotive force for propelling the model train;

a power arrangement, coupled to a model railroad track used by the model train and configured and arranged to supply power to the control and motor arrangement;

a radio control interface, configured to receive commands from a radio controller unit;

a process control arrangement, coupled to receive speed information regarding the rotational velocity of the motor and configured and arranged to generate a plurality of motor control signals based upon a combination of a plurality of speed feedback control signals and pulse width modulation signal;

a motor control arrangement, responsive to the motor control signals and coupled to receive power from the power arrangement and configured and arranged to supply power to the motor at different times based on the motor control signals;

a sound information arrangement, operatively coupled to receive rotational speed and positional information from the motor and to provide the rotational speed and positional information to a sound control arrangement for simulating railroad sounds; and a short circuit protection arrangement operatively coupled to the motor and configured and arranged to remove power from the motor in response to a current flow exceeding a defined threshold.

14. A control and motor arrangement for a model toy train comprising:

a motor, configured and arranged to generate a locomotive force for propelling the model train;

a power arrangement, coupled to a model railroad track used by the model train and configured and arranged to supply power to the control and motor arrangement;

a radio control interface, configured to receive commands from a radio controller unit;

a process control arrangement, coupled to receive speed information regarding the rotational velocity of the motor and configured and arranged to generate a plurality of motor control signals based upon a combination of a plurality of speed feedback control signals and pulse width modulation signal;

a motor control arrangement, including a nonvolatile memory responsive to the process control arrangement, the memory configured and arranged to store user-defined information to provide user-defined information to the process control arrangement and the user defined information comprises a mapping of a motor rotational speed to a land speed on the train, the motor control arrangement responsive to the motor control signals and coupled to receive power from the power arrangement and configured and arranged to supply power to the motor at different times based on the motor control signals; and a sound information arrangement, operatively coupled to receive rotational speed and positional information from the motor and to provide the rotational speed and positional information to a sound control arrangement for simulating railroad sounds.

* * * * *